May 19, 1964
R. R. MANDY
3,133,302
WINDSHIELD CLEANER CONTROL
Filed July 11, 1962
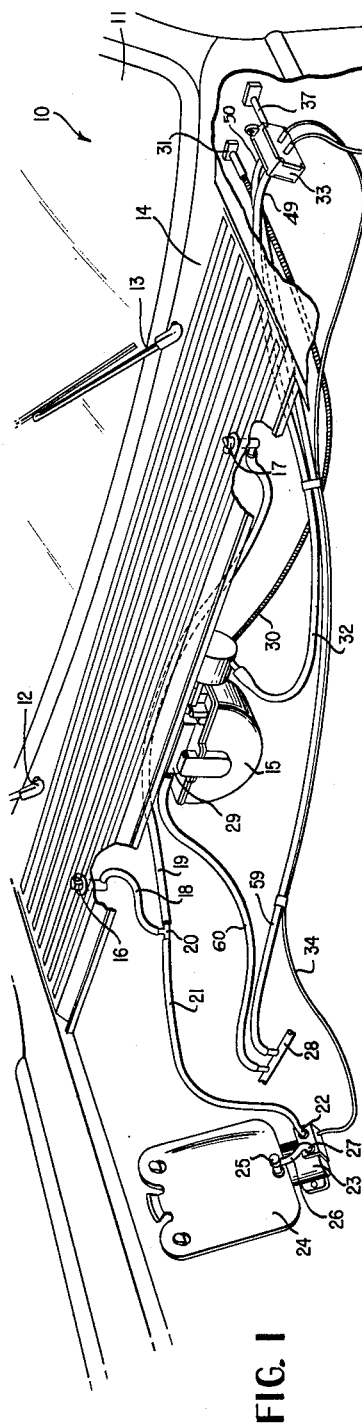
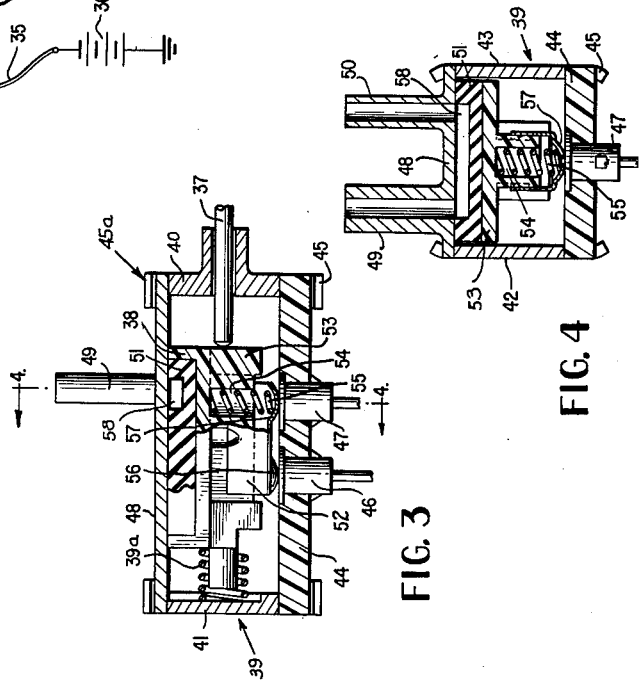
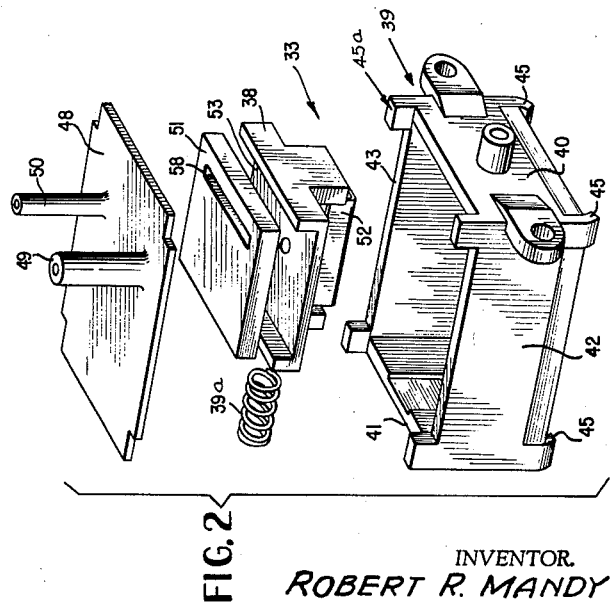
INVENTOR.
ROBERT R. MANDY
BY
ATTORNEY

United States Patent Office 3,133,302
Patented May 19, 1964

3,133,302
WINDSHIELD CLEANER CONTROL
Robert R. Mandy, Detroit, Mich., assignor to The Delman Company, Cookeville, Tenn., a corporation of Tennessee
Filed July 11, 1962, Ser. No. 209,070
7 Claims. (Cl. 15—250.02)

This invention relates generally to windshield clearing systems and more particularly to a unitary control providing for the concurrent operation of the wiper and washer units of the system.

The primary object of this invention is to provide in a windshield clearing system a unitary control for controlling plural motors in the system.

A further object of this invention is to provide a unitary control capable of causing concurrent operation of different types of drive motors for the washer and wiper portions of a windshield clearing system.

A more specific object of this invention is to provide a unitary control on a vehicle, working in conjunction with the electrical and the vacuum systems, to control the concurrent operation of plural motors in a windshield clearing system.

These and other advantages will become readily apparent by reference to the following description when taken in conjunction with the accompanying drawings, wherein:

FIGURE 1 is a fragmentary perspective view of a vehicle illustrating a windshield washer and wiper system with the invention applied thereto;

FIGURE 2 is an exploded view of the unitary control for the wiper and washer system comprising the invention;

FIGURE 3 is a sectioned view in side elevation of the unitary control of the invention, and FIGURE 4 is a sectioned view taken along the line 4—4 of FIGURE 3.

With particular reference to the drawings, an automobile 10, indicated in fragmentary form, is illustrated as having a windshield 11 and wipers 12 and 13 engaging said windshield 11 for clearing the same. The wipers 12 and 13 are mounted in a conventional manner on the hood 14 of the vehicle 10 and are interconnected through linkage not shown beneath the hood with a convention drive motor 15. The drive motor 15 may be pneumatic, hydraulic, or electrical in character.

Also mounted on the hood 14 is a pair of washer nozzles 16 and 17 of conventional design. The nozzles 16 and 17 are interconnected by fluid lines 18 and 19 through a T fitting 20 with a common fluid line 21 which is connected to the outlet 22 from an electric motor driven liquid pump unit 23. Washing liquid is stored in a suitable reservoir 24 having an outlet 25 connected by line 26 with the inlet 27 of the motor pump combination unit 23.

A manifold 28 is utilized to connect the various portions of the wiper system with the intake manifold of the vehicle engine not shown. Suitably mounted on the wiper drive motor 15 is an on-off control of conventional character, such as that completely illustrated in United States Patent 3,000,033. This control 29 is subject to both manual actuation through a Bowden wire 30 connection with manual operating handle 31 mounted within the vehicle, and for remote vacuum control operation through a vacuum line 32 which, in turn, is connected to a unitary, combination control unit 33 mounted on the vehicle dashboard, not shown.

The washer motor pump unit 23 is interconnected by an electrical lead 34 with the combination unit 33. The unit 33 is further connected by electrical lead 35 with a source of electrical energy, designated as the vehicle battery 36 in the drawing.

Briefly, it should become apparent to one skilled in the art that the system includes a washer motor and pump 23 for dispensing fluid from the reservoir 24 to the nozzles 16 and 17 of the washer system while simultaneously providing for actuation of the wiper drive motor 15 through the unitary control member 33 by means of a suction interconnection between the suction manifold 28 and the on-off control 29 for the motor. In other words, actuation of the unitary control 33 will simultaneously and concurrently operate both motors to do the cleaning job on the windshield. The system may provide such other refinements as time delay devices for the purpose of gaining an extra cycle or more of the wiper drive motor after the washer motor pump unit has been deactivated, such as illustrated in Patent 3,000,033.

Referring now more particularly to the heart of the present invention, attention is directed to FIGURES 2, 3 and 4 wherein the unit 33 is illustrated as having an actuating handle 37 which is operable in much the same manner as a push button from the interior of the vehicle 10. The inner terminus of the handle 37 engages against a reciprocable valving member 38 to move the member 38 against the bias of a coil spring 39a. As illustrated, the unit 33 comprises a casing 39 including a front wall 40, a rear wall 41 and side walls 42 and 43. A bottom wall 44 is suitably connected as by bending over portions 45 of the side walls to thereby clamp the bottom wall 44 to the general casing 39. The bottom wall 44 is provided with a pair of electrical terminals 46 and 47 for a purpose to be described. Casing 39 is further provided with a top cover 48 having integrally formed therein fluid terminals 49 and 50. The cover 48 is attached to the casing 39 by bending over portions 45a of the side walls 42 and 43.

The reciprocable member 38 is illustrated as being formed of three parts including an upper valving plate 51, a lower switch plate 52, both of which are supported on opposite sides of a carrier member 53. Internally of the carrier member 53 is a pair of recesses 54, one of which is illustrated in FIGURES 3 and 4, to receive a pair of coil springs 55 which act on the underside of the switch plate 52 to move the shiftable plate outwardly against the inner surface of the bottom wall 44 of the casing 39. The switch plate 52 is provided with a pair of contact button areas 56 and 57 which will appropriately bridge the electrical terminals 46 and 47 when the reciprocable member 38 is sufficiently actuated by the handle member 37. The springs 55 in pressing outwardly on the plate 52 also press upwardly in the opposite direction on the carrier member 53 whereby the valving plate 51 is held firmly in engagement with the inner surface of the upper wall 48 of the casing 39. The valve plate 51 includes a channeled area 58 which is so positioned in the plate 51 as to exactly bridge and open to each other the fluid terminals 49 and 50 coincident with the bridging action of the conductor plate 52 of the electrical terminals 46 and 47.

Operation of the control unit 33 should now be readily apparent to one skilled in the art. A reciprocation of the handle 37, overcoming the bias of coil springs 39a, which presses between the end wall 41 and the rear area of the reciprocable member 38, causes a simultaneous bridging of the terminals 46 and 47 of the electrical side of the unit and the fluid terminals 49 and 50 on the fluid side of the unit. Bridging of the terminals 46 and 47 will cause energization of the combination washer motor and pump 23 to drive water from reservoir 24 to the nozzles 16 and 17 in the usual manner. A bridging of the fluid terminals 49 and 50 will cause actuation of the motor on-off control 29 through the conduit 32 and a line 59 connected with the vacuum manifold 28; the motor 15 being continuously connected through the on-off control 29 with the manifold 28 through the line 60. It is quite obvious that the on-off control 29 as actuated by the vacuum source through the unitary control may be a switch for energizing an electric drive motor or may be a valve for controlling either an hydraulic motor or a vacuum motor, as illustrated here by the unit 15.

Although a single preferred embodiment of the present invention has been disclosed herein, it is to be remembered that various modifications and alternate constructions may be made within the full intended scope of the invention as defined in the appended claims.

I claim:

1. In a vehicle windshield clearing system which includes a wiper unit with a motor to drive the same, an on-off control operable to connect the wiper motor with a source of vacuum, windshield spray nozzles, a reservoir, a pump with an electric motor drive to direct liquid from the reservoir through fluid lines to the nozzles, and a source of electrical energy,
   (a) a combination actuator for connecting the vacuum source to the wiper motor on-off control and concurrently connecting the source of electric energy to the washer electric motor,
   (b) a vacuum line interconnecting the vacuum source with the wiper motor on-off control through the actuator,
   (c) electrical leads interconnecting the actuator with the electric washer motor through said source of electrical energy,
   (d) electrical terminals mounted on said actuator,
   (e) a movable valve member within said actuator and operable to open and close the vacuum line to connect and disconnect the source of vacuum and the wiper motor on-off control, and
   (f) an electrical bridging conductor mounted on said movable valve member and operable to contact said electrical terminals to connect and disconnect the source of electric energy and the washer electric motor, actuation of the movable valve member simultaneously energizing the electric washer motor and the wiper motor when the bridging conductor engages the electric terminals and when the valve member opens the vacuum line to the motor on-off control.

2. The invention according to claim 1 wherein:
   (a) a second independent means is provided in the system to control independent operation of the wiper motor through said on-off control.

3. In a vehicle windshield clearing system which includes a wiper unit with a motor to drive the same, an on-off control operable to connect the wiper motor control with a source of vacuum, windshield spray nozzles, a reservoir, a pump with an electric motor drive to direct liquid from the reservoir through fluid lines to the nozzles, and a source of electrical energy,
   (a) a combination actuator for connecting the vacuum source to the wiper motor on-off control and concurrently connecting the source of electric energy to the washer electric motor,
   (b) a vacuum line interconnecting the vacuum source with the wiper motor on-off control through the actuator,
   (c) electrical leads interconnecting the actuator with the electric washer motor through said source of electrical energy,
   (d) electrical terminals mounted on said actuator,
   (e) fluid terminals defining inlet and outlet passages on said actuator for connection with said vacuum line,
   (f) a reciprocable internal member having a fluid passage positioned within said actuator, said fluid passage on movement of said internal member connecting and disconnecting said inlet and outlet passages thereby connecting and disconnecting the source of vacuum and the wiper motor on-off control, and
   (g) an electrical bridging conductor mounted on said internal member and operable to couple said electrical terminals to connect and disconnect the source of electric energy and the washer electric motor, operation of the reciprocable internal member of the actuator in one direction causing the bridging conductor to engage the electric terminals of the actuator to energize the washer motor and causing, simultaneously, the fluid passage of the internal member to bridge the inlet and outlet fluid terminals resulting in operation of the wiper motor on-off control, and movement of the internal member in the other direction causing deactivation of both said motors.

4. The invention according to claim 3 wherein:
   (a) a second independent means is provided in the system to control independent operation of the wiper motor through said on-off control.

5. A control unit for a windshield clearing system which includes a wiper motor connected to a source of energy by an on-off control, vacuum controlled means connected to a source of vacuum for actuating said control to connect and disconnect the wiper motor with the source of energy, and an electric washer motor operable from a source of electric energy comprising:
   (a) carrier means movable from a first position to a second position,
   (b) means biasing said carrier means toward said first position,
   (c) valve means having a movable member mounted on said carrier means for movement therewith from a first position to a second position to connect the vacuum source with the vacuum controlled means, and
   (d) switch means having a movable conductor mounted on said carrier means for movement therewith from a first position to a second position to connect the electric washer motor with the source of electric energy substantially simultaneously with the actuation of the vacuum control means.

6. A control unit for a windshield clearing system which includes a wiper motor connected to a source of energy by an on-off control, vacuum controlled means connected to a source of vacuum for actuating said control to connect and disconnect the wiper motor with the source of energy, and an electric washer motor operable from a source of electric energy comprising:
   (a) carrier means having a top section and a bottom section,
   (b) means for guiding said carrier means for movement in a linear path between a first position and a second position,
   (c) valve means having a movable member mounted on the top section of said carrier means for linear movement therewith from a first position to a second position to connect the vacuum source with the vacuum controlled means, and
   (d) switch means having a movable conductor mounted on the bottom section of said carrier means for linear movement therewith from a first position to a second position to connect the electric washer motor with the source of electric energy substantially simultaneously with the actuation of the vacuum control means.

7. The control unit defined in claim 6 including:
   (a) means for biasing said carrier means toward said first position.

References Cited in the file of this patent

UNITED STATES PATENTS

| | | |
|---|---|---|
| 2,970,336 | Webb | Feb. 7, 1961 |
| 3,003,171 | Oishei | Oct. 10, 1961 |